United States Patent [19]

Pelletier et al.

[11] Patent Number: 5,269,632
[45] Date of Patent: Dec. 14, 1993

[54] METHOD FOR STRENGTHENING THE STRUCTURAL BASE OF OFFSHORE STRUCTURES

[75] Inventors: John H. Pelletier, Houston; Kenneth M. Cowan, Sugar Land; Arthur H. Hale, Houston, all of Tex.

[73] Assignee: Shell Oil Company, Houston, Tex.

[21] Appl. No.: 965,093

[22] Filed: Oct. 22, 1992

[51] Int. Cl.5 .............................. E02D 3/12
[52] U.S. Cl. .................. 405/263; 405/217; 405/266; 106/607
[58] Field of Search ............... 405/203-208, 405/195.1, 233, 263-267, 217; 106/606, 607

[56] References Cited

U.S. PATENT DOCUMENTS

| | | |
|---|---|---|
| 2,336,723 | 12/1943 | Drummond ............... 106/607 |
| 2,649,160 | 8/1953 | Williams et al. . |
| 2,880,096 | 3/1959 | Hurley . |
| 2,895,301 | 7/1959 | Casagrande et al. . |
| 2,938,353 | 3/1960 | Vorenkamp . |
| 2,961,044 | 11/1960 | Shell . |
| 3,021,680 | 2/1962 | Hayward . |
| 3,168,139 | 2/1965 | Kennedy et al. . |
| 3,412,564 | 11/1968 | McClintock . |
| 3,499,491 | 3/1970 | Wyant et al. . |
| 3,557,876 | 1/1971 | Tragesser . |
| 3,670,832 | 6/1972 | Striegler . |
| 3,675,728 | 7/1972 | Faulk et al. . |
| 3,712,393 | 1/1973 | Sheldahl et al. . |
| 3,724,562 | 4/1973 | Striegler . |
| 3,820,611 | 6/1974 | King . |
| 3,835,939 | 9/1974 | McEntire . |
| 3,887,009 | 6/1975 | Miller et al. . |
| 3,962,878 | 6/1976 | Hansen . |
| 4,014,174 | 3/1977 | Mondshine ............... 405/233 |
| 4,037,424 | 7/1977 | Anders . |
| 4,057,116 | 11/1977 | Striegler . |
| 4,215,952 | 8/1980 | Baardsen . |
| 4,252,471 | 2/1981 | Straub . |
| 4,335,980 | 6/1982 | DePriester . |
| 4,338,134 | 7/1982 | Graf zu Munster . |
| 4,425,055 | 1/1984 | Tiedemann . |
| 4,427,320 | 1/1984 | Bhula . |
| 4,450,009 | 5/1984 | Childs et al. ............. 106/606 |
| 4,460,292 | 7/1984 | Durham et al. . |
| 4,518,508 | 5/1985 | Conner ................. 106/607 X |
| 4,643,617 | 2/1987 | Kanno et al. ............ 405/222 |
| 4,664,843 | 5/1987 | Burba, III et al. . |
| 4,668,128 | 5/1987 | Hartley et al. . |
| 4,692,065 | 9/1987 | Suzuki et al. ........... 405/217 X |
| 4,720,214 | 1/1988 | Brasted et al. . |
| 4,746,245 | 5/1988 | Mork ................. 405/204 X |
| 4,760,882 | 8/1988 | Novak . |
| 4,761,183 | 8/1988 | Clarke . |
| 4,790,954 | 12/1988 | Burba, III et al. . |
| 4,880,468 | 11/1989 | Bowlin et al. . |
| 4,897,119 | 1/1990 | Clarke . |
| 4,913,585 | 4/1990 | Thompson et al. . |
| 4,942,929 | 7/1990 | Malachosky et al. . |
| 4,991,668 | 2/1991 | Rehm et al. . |
| 5,016,711 | 5/1991 | Cowan . |
| 5,026,215 | 6/1991 | Clarke ................. 405/267 X |
| 5,058,679 | 10/1991 | Hale et al. . |
| 5,086,850 | 2/1992 | Harris et al. . |
| 5,105,885 | 4/1992 | Bray et al. . |
| 5,106,423 | 4/1992 | Clarke . |
| 5,121,795 | 6/1992 | Ewert et al. . |
| 5,123,487 | 6/1992 | Harris et al. . |
| 5,125,455 | 6/1992 | Harris et al. . |
| 5,127,473 | 7/1992 | Harris et al. . |
| 5,147,565 | 9/1992 | Bour et al. ............... 106/606 X |

FOREIGN PATENT DOCUMENTS 85144069  7/1983  Japan .

OTHER PUBLICATIONS

"Deep Cement Mixing Experience in Japan", by G. Dennis et al, Copyright 1985 Seabed Strengthening Symposium, Denver, Colo., Jun. 4, 1985, TP 85-5.
(List continued on next page.)

Primary Examiner—Dennis L. Taylor

[57] ABSTRACT

A method for strengthening the soil and rock formations forming the structural base of a structure wherein a cement slurry is injected into the soil and rock formations. The method is particularly useful in strengthening the foundations of offshore structures.

16 Claims, 1 Drawing Sheet

OTHER PUBLICATIONS

"Mud Disposal: An Industry Perspective", Hanson et al, Drilling, May 1986, pp. 16-21.

"Waste Minimization Program Can Reduce Drilling Costs", Hall et al, Oryx Energy Co., Houston, Tex. Oil & Gas Journal, Jul. 1, 1991, pp. 43-46.

"Phosphoric Acids and Phosphates", Kirk-Othmer Enc. of Chemical Technology, 3rd Ed., vol. 17, p. 477.

"Conversion of Drilling Fluids to Cements with Blast Furnace Slag-Performance Properties and Applications for Well Cementing", SPE Paper 24575 (Oct. 4, 1992) by Cowan et al.

"Quantitative Interpretation of X-Ray Diffraction Patterns of Mixtures. I. Matrix-Flushing Method for Quantitative Multicomponent Analysis" by Frank H. Chung, J. Appl. Cryst. (1974) 7, pp. 519-525.

METHOD FOR STRENGTHENING THE STRUCTURAL BASE OF OFFSHORE STRUCTURES

BACKGROUND OF THE INVENTION

The present invention relates to offshore drilling structures and particularly to a method for strengthening and consolidating the sea bottom formations that underlie a gravity-anchored offshore structure. The term "gravity-anchored" structure is used to describe the steel or concrete structures that have been proposed for use in the shallow waters offshore Northern Alaska or Canada and the similar type structures that have been used in the North Sea. All of these structures are massive and depend upon their weight, skirt configuration (if any), and the strength of the underlying soil for anchoring them in position at the offshore location.

In most locations where such structures are used the bottom underlying the structure comprises an unconsolidated soil formation. Often foundation skirts are used to key the base of the structure into the soil. In order to minimize the base area required, a means must be provided for strengthening and consolidating the bottom to support the structure and prevent the structure shifting as a result of wave action or, in the case of Arctic structures, moving ice contacting the structure.

In addition to the above problems, it is also possible for the soil itself to become liquified as a result of the differential pore pressure between the external hydrostatic pressure and the pressure existing in the soil underlying the structure. In these conditions, the soil will liquify and the ability of the sea bottom formation to support the structure will be greatly reduced.

The above conditions have been recognized in the prior art and various steps have been taken to provide a solution. One of the simplest approaches is to replace the soil formation where the structure is to be located with other material such as gravel and the like to provide the necessary foundation for the structure. While this is a solution, it is expensive and at times difficult to accomplish.

Other solutions have been proposed such as attempting to equalize the pore pressure in the formation underlying the structure with the external hydrostatic pressure. This approach is described in U.S. Pat. No. 3,962,878.

Additional approaches have been to modify the portion of the structure that is resting on the bottom so that the design itself will resist movement of the structure. These approaches are described in U.S. Pat. Nos. 2,895,301 and 4,037,424. While these approaches improve the anchoring of the structure in the desired location, they do not address the problem of supporting the structure on the soft soil and silt which forms the sea bottom in many offshore locations.

An additional approach to stabilizing and strengthening soil and rock formations in underground structures is described in U.S. Pat. No. 5,026,215. This patent teaches injecting a cement slurry into the formation to strengthen and consolidate the formation. The slurry uses water and a combination of particulate slag and Portland cement to form the cementitious material. In particular, the slag is an ultra fine material having a surface area of greater than 9500 $cm^2/g$. The patent utilizes fresh water as the aqueous phase in order to be compatible with the Portland cement, and it is therefore not suitable for use in offshore locations where the water is salt water and incompatible with Portland cement.

A further approach to strengthening weak soils is discussed in a paper entitled "Deep Cement Mixing Experience in Japan", G. Dennis et al., presented at the Seabed Strengthening Symposium at Denver, Col., Jun. 4, 1985. This paper describes the mixing in place of Portland cement with weak soils to strengthen them. The paper also describes various types of machinery that can be used to perform in-place mixing of Portland cement and soil.

SUMMARY OF THE INVENTION

The present invention solves the above problems by utilizing the cement mixture described in U.S. Pat. No. 5,058,679 to form a slurry which can be injected into or mixed with the weak soil formations that underlie the location of the offshore platform. This patent describes a cement mixture formed from a blast furnace slag having a fineness of between 4,000–6,000 $cm^2/g$ and brine or seawater, preferably the drilling fluid that is used for drilling offshore wells. The patent also describes the use of various additives for controlling the setting and hardening time of the cementitious material as well as its rheological properties of the mixture.

The present invention uses the process of producing the material described by the '679 patent and injects it directly into or mixes it with the formation underlying the location of the offshore structure. The material can be injected by various means, for example, shallow holes may be drilled in the formation and the cementitious material injected directly into the formation from the drill string used for drilling the holes. Since the material is compatible with both the soil existing in offshore locations and the sea water, there is no necessity for removing the drill bit cuttings and sea water from the drilled hole prior to injecting the cementitious mixture. An additional method in those cases where the offshore structure forms a drilling platform is to use the drilling facilities of the platform to drill at least one hole through which the cement mixture may be injected. In addition, various equipment disclosed in the prior art for in-place mixing of cement and soil can be used.

DESCRIPTION OF PREFERRED EMBODIMENTS

Figure 1:
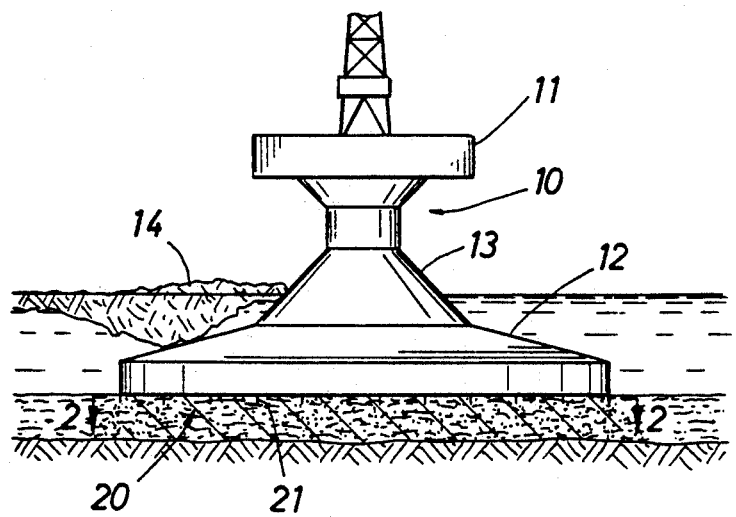
FIG. 1 depicts an Arctic gravity structure supported from the sea bottom in which the portion of the bottom formation underlying the platform has been strengthened and consolidated to a uniform depth.

The cementitious slurry used in the present invention comprises a pumpable slurry formed from a mixture of brine or seawater, blast furnace slag and suitable additives. In particular, the preferred blast furnace slag is a high glass content slag produced by quickly quenching molten slag through intimate contact with large volumes of cool water. The fineness of the blast furnace slag is preferably between 3,000 and 9,000 $cm^2/g$ and more preferably between 4,000 and 9,000 $cm^2/g$. The sea water may be conventional waters from the oceans of the world or seawater-based drilling mud conventionally used in drilling offshore wells. These drilling muds usually have additives to improve their characteristics or add weight to the fluid. One normally used additive is lignosulfonate that is particularly useful in the cement slurry of the present invention since it acts as a retarder in the setting of the cement and increases the time available for pumping the cement into the weak formation that is to be strengthened as described hereinafter. The presence of various weighting materials in the drilling mud will not affect its use in forming the pumpable slurry of the present invention since these materials are compatible with the blast furnace slag which forms the cementitious material of the slurry. In addition, it is preferable to add to the slurry activators such as the alkali metal oxides or hydroxides. Two useful materials are caustic soda and soda ash since both of these materials are readily available at low cost.

The rheological properties of the slurry can be controlled by adding various chemical dispersants to the water-based drilling fluids. A simple method would be to add additional lignosulfonates to the drilling fluid since this is a useful chemical dispersant and is readily available throughout the drilling industry.

The water-to-solids ratio in the slurry should be controlled so that it is readily pumpable and, in addition, will flow or permeate the formation that is to be strengthened and consolidated. Conventionally, the water-to-solids ratio should be maintained between 200 and 500 lbs of blast furnace slag per barrel of water. The amount of slag used will depend upon the desired pumpability of the slurry, for example, 200 lbs will provide an easily pumpable slurry that has good flow properties. In addition, small amounts of caustic soda or soda ash may be added to control the setting time of the slurry, for example, 5 to 20 lbs/bbl of caustic soda and 5 to 15 lbs of soda ash, with the amounts depending upon the desired setting time of the slurry. In addition, a small quantity of lignosulfonates may be added, i.e., 1 to 10 lbs/bbl. This combination will provide an easily pumpable slurry which will readily permeate formations to strengthen them.

An alternate cementitious slurry can be formed from an ionomer, for example, organometal compositions having a metal attached to or interlocking (crosslinking) a polymer chain. Suitable polymer components of such ionomers can be represented by the formula

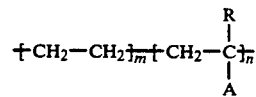

wherein A is

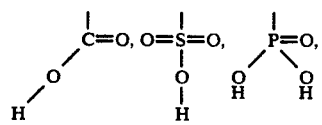

or a mixture of

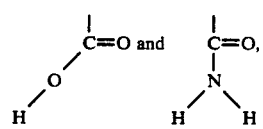

and wherein R is H or a 1–10 carbon atom alkyl radical. The ratio of m to n is generally within the range of 0:1 to 100:1, preferably 0.1:1 to 10:1.

The polymers generally have a ratio of functional groups to polymer chain carbons within the range of 1:2 to 1:10, preferably about 1:3. Thus, if m and n are 1, R is H and A is carboxylate, there would be a ratio of carboxylic carbons (1) to polymer chain carbons (4) of 1:4. The polymer can also be a polycarboxylic acid polymer. One of the more preferred polymers is that made from partially hydrolyzed polyacrylamide. The hydrolysis can vary from 1% up to 100% and preferably from 10% to 50%, most preferably from 25% to 40%. The molecular weight of the polymers can vary widely so long as the polymers are either water-soluble or water-dispersable. The weight average molecular weights can range from 1000 to 1,000,000 but preferably will be in the range of 1,000 to 250,000, most preferably 10,000 to 100,000. Carboxylate polymer with a low ratio of COOH:C within the range of 1:3 to 2:5 are preferred. Especially preferred is a carboxylic acid polymer having a ratio of carboxylic carbons to polymer chain carbons (including carbons of pendant chains) of about 1:3 and a molecular weight within the range of 10,000 to 100,000. Partially hydrolyzed polyacrylamide polymers in the range of 5,000–15,000,000 molecular weight are suitable. The copolymers will generally have from 2–99, preferably 5–80, more preferably 10–60 mole percent acid-containing units.

The particle size of the metal compound component can vary widely. Generally, it will be within the range such that the powder exhibits a surface area within the range of 500 cm$^2$/g to 30,000 cm$^2$/g, preferably 1,500 cm$^2$/g to 25,000 cm$^2$/g, most preferably 2,000 cm$^2$/g to 20,000 cm$^2$/g.

The poly(carboxylic acid) component can be any water soluble or water dispersable carboxylic acid polymer which will form ionomers. Ionomer forming polymers are well known in the art. Suitable polymers include poly(acrylic acid) poly(methacrylic acid), poly(ethacrylic acid), poly(fumaric acid), poly(maleic acid), poly(itaconic acid) and copolymers such as ethylene/acrylic acid copolymer and ethylene/methacrylic acid copolymer. The copolymers are generally random copolymers. An example of phosphonic acid polymers is poly(vinyl phosphonic acid) which is made from vinyl phosphonic acid,

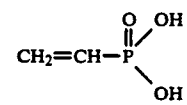

Suitable copolymers containing vinyl phosphonic acid include vinyl phosphonic acid/acrylic acid copolymer as well as copolymers with other unsaturated monomers, with or without a functional group.

In some instances, it is preferred to use water dispersable, as opposed to water soluble, polymers. Ideally, in such instances the melting point of the polymer should be higher than the placement temperature (circulating temperature) in the wellbore during the "cementing" operation and lower than the maximum, static temperature of the surrounding formations. It is desirable for the polymer to melt and react after placement as the temperature in the wellbore increases from the circulating temperature to the static temperature of the surrounding formations.

The ionomers suitable for use in this invention are the water-insoluble reaction product of a proton acceptor metal compound which serves as the cementitious component and a carboxylic, sulfonic, or phosphonic acid polymer component. The metal compound generally is a metal oxide such as CaO, MgO, ZnO or MnO. The preferred metal oxides are magnesium oxide and zinc oxide, and most preferably, magnesium oxide. The applicable metal oxides are generally fired at temperatures above 1,000° F. for several hours to reduce chemical activity prior to grinding to final particle size for use in reacting with the acid component.

In instances where it is desired that the metal compound component add weight to the drilling fluid, the metal compound is preferably a water-insoluble metal compound with a specific gravity of at least 3.0, preferably 3.5. By 'insoluble' is meant that less than 0.01 parts by weight dissolve in 100 parts by weight of cold (room temperature) water.

The amount of polymer utilized will vary widely depending upon the carboxylic acid content of the polymer; broadly, 10 to 200, preferably 10 to 100, most preferably 10 to 80 wt %, based on the weight of metal compound, can be present. With the polymers having a low ratio of m to n, a smaller amount is required because of the higher functional group content of the polymer. Conversely, with the high ratio of m to n, an amount of polymer toward the higher end of the ranges is preferred.

Phosphates and phosphonates, referred to herein as phosphorus salts, used in accordance with this invention also are produced from a two-component composition, the first component of which is a metal compound identical in scope to that used in the ionomers as described hereinabove so long as the resulting phosphorus salt is insoluble in water. Most preferred are CaO, MgO and ZnO.

The second component is a phosphonic or phosphoric acid, preferably a polyphosphoric acid. The term 'phosphoric acid' is meant to encompass both linear and cyclic polyphosphoric acids. These second component acids are referred to herein as phosphorus acids. Linear phosphoric acids can be depicted by the general formula $H_{n+2}P_nO_{3n+1}$ where n is 1-100, preferably 2-50, more preferably, 2 to 20. Examples include di-(pyro)phosphoric acid, tri-(tripoly)phosphoric acid, tetra-phosphoric acid and higher molecular weight polyphosphoric acids as well as phosphoric acid. Mixtures of acids, including those traditionally referred to as meta phosphoric acid, are particularly suitable for use in this invention.

The formation of one phosphate cement using a metal oxide as the metal compound can be depicted as follows:

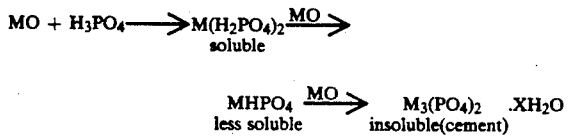

where
X is usually 4; and
MO = metal oxide which is amphoteric or is a proton acceptor.

With the ionomers, and the phosphorus salts when made with a polyvalent metal compound, a crosslinked network structure exists as a result of the addition of the second component, thus giving a very strong solid cement.

Because of the mass provided by the metal compound component of the ionomer or the polyphosphorus salt, these cementitious materials are generally actually heavier than most slag or Portland cement materials. In the embodiments using these cementitious materials this high density provides significant advantages in certain utilities. For one thing, a smaller amount of the material can be used and still achieve a cement of a desired density.

The metal compound of the ionomer or phosphorus salt can be used as the sole cementitious material or can be used in admixture with siliceous hydraulic materials such as the blast furnace slag or Portland cement. In one embodiment an hydraulic component such as slag can be used to give the metal ion component of the ionomer or phosphate to give, in effect, a mixture formed in situ.

Preferably, when the ionomer or phosphorus salt is utilized, the metal compound is added first and thereafter at such time as it is desired for the cement to be activated to set, the other component is added. In the case of the universal fluids, a portion of the total metal compound can be added to the drilling fluid, the remainder being added after dilution when the cementitious slurry is being formed.

The addition of additional components to the drilling fluid can be carried out by adding the components directly to a flowing stream of the drilling fluid. An alternate procedure would be to place the drilling fluid in a tank, add the additional components and then mix the drilling fluid and the additional components to produce the cementitious slurry.

A further process for injecting the slurry into the soil would be the use of various mixing devices that have been developed for injecting Portland cement slurries into soil formations. This process is carried out using a rig similar to a rotary drill rig that is equipped with auger-type mixing fins at the bottom. The rotary drill can be run into the soil to the desired depth and then withdrawn as the slurry is pumped down the drill string. The rotation of the drill is continued as the drill is withdrawn to continuously mix the cement slurry with the soil. A pattern of overlapping holes could be used to completely cover the desired area. Machines have been developed that use multiple rotary drills mounted on a single frame. These machines are capable of treating a larger volume of the soil on a single pass than when a single drill bit is used. This process also produces a more uniform mixing of the slurry with the soil than is obtained when the slurry is injected through a single borehole.

Figure 2:
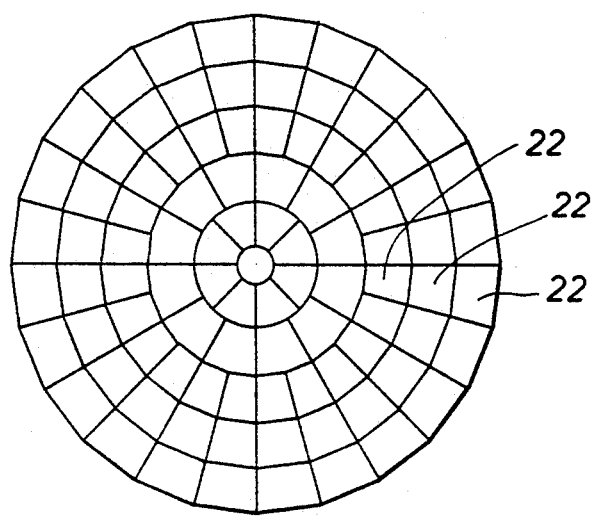
FIG. 2 is a cross section taken along line 2—2 of FIG. 1.

Referring now to FIGS. 1 and 2, there is shown an Arctic offshore structure 10 that is suitable for use in shallow waters offshore of Northern Alaska or Canada. This type of structure is normally provided with an upper section 11 which is joined to a lower section 12. The lower section 12 has a frustoconical shape to provide an inclined surface 13 for deflecting moving ice 14 which is present over most of the year in the offshore Arctic waters. This type of structure can be formed of reinforced concrete or if desired, can be a steel structure having suitable internal bracing to withstand the impact of ice floes on the inclined surface of the lower section. Whether the structure is concrete or steel, it has considerable weight that is utilized to anchor the structure by gravity in the desired location. While the weight of the structure is desirable for anchoring it in position, it is undesirable in that the soils forming the bottom of the offshore areas of the Arctic are normally unconsolidated, being sand, silt, and clay soils having a high water content. These soils may be unable to support the weight of the structure and provide enough lateral restraint to prevent the structure sliding or tipping due to lateral loads imposed by ice or waves moving against the structure. In such cases some method must be provided for strengthening the soil.

The present invention solves the problem by injecting either of the above-described cementitious slurry mixtures into the portion of the bottom which underlies the structure 10. When the cementitious slurry mixture solidifies, it will form a strengthened and consolidated formation 20 which is capable of supporting the weight of the structure and resisting lateral loads due to ice and waves. The depth of the strengthened and consolidated formation depends upon the weight of the structure, the magnitude of ice and/or wave loads, and the area over which the load is distributed.

Referring to FIG. 2, there is shown a cross sectional area through the bottom of skirt system 21 of the structure. The skirt system 21 is divided into a plurality of individual compartments 22 as shown in FIG. 2. The soil underlying the structure can be leveled by making provisions in the structure to inject the cementitious slurry through each of the compartments 22. Either of the above-described cementitious slurries are then injected into the voids below each of the compartments and, if desired, sufficient pressure applied through pumps or other means to cause it to flow into the voids. Either of the cementitious slurries described above are compatible with both the sea water and the solids present in the formation underlying the offshore location. Thus, the slurry mixture will harden and provide a level surface and substantially complete contact with the bottom of the base.

An alternative to the above process is the strengthening of the soil prior to moving the structure into place. This can be done by injecting one of the above-described cementitious slurries into the soil formations. In those cases where the water is relatively shallow, the mixing devices described in the prior art can be used to mix the cementitious slurry with the soil.

Figure 3:
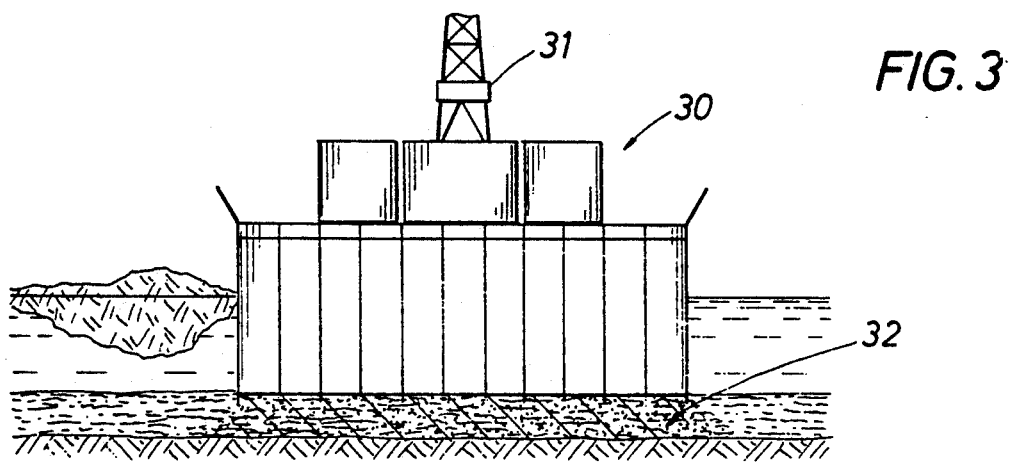
FIG. 3 is a second embodiment of the invention depicting a different type of Arctic structure in which the formation is strengthened.

A further method for strengthening and consolidating the formation is shown in FIG. 3 in which the structure 3 is shown being positioned at the desired location. The structure shown in FIG. 3 includes a drilling rig 31 that is used to drill a larger and deeper borehole in the formation. The drilling rig 31 can be used to drill a series of boreholes below the structure 30 using either sea water as a drilling fluid or one of the above-described drilling fluids, and injecting the cementitious slurry into the soil to strengthen it. When one of the above-described drilling fluids are used, it is converted to a cementitious slurry by adding the cementitious component following one of the above procedures. When sea water is used as a drilling fluid it can be converted to a cementitious slurry by adding blast furnace slag as a cementitious material as described above. An alternative would be to add a metal oxide and water-soluble or water-dispersable polymer, also as described above. After the drilling fluid is converted to a cementitious fluid, it can be pumped down the drill string and forced into the formation. In this case, the strengthened and consolidated formation will assume a rough, irregular, circular shape as shown in FIG. 3. It is obvious that the cementitious slurry will penetrate the shallower depth formations to a greater distance than the deep zones since they are less consolidated. After the cementitious slurry has hardened, it will provide a strengthened formation 32 which is capable of supporting the weight of the structure 10 and lateral loads due to ice.

The advantage of the above method for strengthening and consolidating a formation is a result of the compatibility of the cementitious slurries with seawater. Since the slurries are compatible with seawater, there is no need to remove either the drill bit cuttings or the seawater from the borehole prior to injecting the slurries.

While the above described preferred embodiments relate to the strengthening and consolidation of formations in offshore locations, it can be used to strengthen and consolidate onshore formations. The method is particularly useful in strengthening and consolidating formations that support large buildings.

What is claimed is:

1. A method for strengthening the soil and rock formations forming the structural base for an offshore structure, comprising:
   preparing a pumpable slurry mixture comprising salt water and a blast furnace slag cementitious material;
   injecting said slurry mixture into the soil and rock formations; and
   allowing said slurry mixture to harden to strengthen the soil and rock formations.

2. The method of claim 1 wherein said cementitious material has a fineness of less than 9,000 cm$^2$/g.

3. The method of claim 2 wherein said cementitious material has a fineness of between 4,000 and 9,000 cm$^2$/g.

4. A method for installing a gravity-anchored offshore structure at a location having an unconsolidated bottom formation, said method comprising:
   preparing a pumpable slurry mixture comprising salt water and a blast furnace slag cementitious material;
   injecting said pumpable slurry mixture into said bottom formation over an extended area;
   allowing said slurry mixture to harden; and
   installing said structure over at least a portion of the area in which said slurry mixture is injected.

5. The method of claim 4 wherein said extended area is substantially equal to the area of the bottom of said structure.

6. The method of claim 5 wherein the slurry is injected at a plurality of locations within the extended area to provide substantially complete coverage of the extended area with said slurry.

7. A method for installing a gravity-anchored offshore structure at a desired location having an unconsolidated bottom formation, said method comprising:
   positioning the structure at the desired location and lowering said structure until it contacts the bottom;
   preparing a pumpable slurry comprising salt water and a blast furnace slag cementitious material;
   injecting said pumpable slurry into at least the bottom formation underlying said structure; and
   allowing said injected slurry to harden to strengthen said formation and support said structure.

8. The method of claim 1 wherein said pumpable slurry, in addition, includes a retarding material, and an activating material.

9. The method of claim 1 wherein the salt water is sea water.

10. The method of claim 8 wherein the salt water comprises drilling fluid used in drilling wells in offshore locations.

11. The method of claim 9 where said retarding material is a lignosulfonate and said activating material is an alkali metal oxide or hydroxide.

12. The method of claim 7 wherein the slurry, in addition, includes retarding and activating materials.

13. A method for strengthening the soil and rock formations forming the structural base for an offshore structure, comprising:
 preparing a pumpable slurry mixture comprising salt water and a cementitious material formed from a combination of a metal oxide and a water soluble or water dispersable polymer having carboxylic, sulfonic or phosphonic groups;
 injecting said slurry mixture into the soil and rock formations; and
 allowing said slurry mixture to harden to strengthen the soil and rock formations.

14. The method of claim 13 wherein the metal oxide is magnesium oxide or zinc oxide.

15. The method of claim 14 wherein the metal oxide is magnesium oxide.

16. A method for strengthening a weak soil formation underlying an offshore location, said method comprising:
 preparing a cementitious slurry comprising salt water and a blast furnace slag cementitious material;
 injecting said slurry into the soil formation;
 mixing the slurry with the soil formation; and
 allowing said cementitious slurry and soil mixture to harden to provide a strengthened soil formation.

* * * * *